June 26, 1945.  O. W. POST  2,378,949

FILTER FUNNEL

Filed Jan. 18, 1944

INVENTOR
OTTO W. POST
BY Clark & Ott
ATTORNEYS

Patented June 26, 1945

2,378,949

UNITED STATES PATENT OFFICE 2,378,949

FILTER FUNNEL

Otto W. Post, Maspeth, N. Y.

Application January 18, 1944, Serial No. 518,697

5 Claims. (Cl. 210—120)

This invention has general reference to filter funnels of the type which are employed in laboratory work, usually in connection with a suction flask, and the device of the invention constitutes an improvement in that class of filter funnels which are generally used without filter paper and which at present embody a filter disk of fritted or sintered glass, that is, which have a glass partition wall secured within the funnel body and made up of powdered glass which has been partially fused together to define in the partition a multiplicity of minute filtering openings, interstices or pores.

All filters, when analyzed, essentially consist of one or more openings or interstices, each of which is defined either by an endless edge or a plurality of edges spaced apart so as to allow certain constituents of a filter mass to pass therethrough while retaining other constituents thereof or preventing the same from passing through said openings or interstices of the filter. Funnels including filter disks or partitions of the character set forth while highly effective for their intended purpose, have one serious drawback namely, when the interstices, openings or pores thereof become coated with or clogged by the filtrate, the edges thereof cannot be separated and exposed for mechanical cleansing and inspection of the same. In many instances where the cleansing is accomplished by means of solvents or oxidizing agents, it has been found difficult and if not impossible, has proved impractical due to the excessive costs of the agents employed, which in some cases exceed the initial cost of the funnel.

It is therefore the main purpose of the present invention to provide an improved filter funnel of the indicated character and for the purpose set forth which includes interfitting elements respectively provided with cooperative or coacting filtering edges or surfaces which, while functioning as effectively if not more efficiently than fritted or sintered glass filter disks, permits of the ready separation of the cooperative filtering edges to expose the same for visual inspection and mechanical cleansing.

It is also an aim of the invention to provide a filter funnel of the type specified which is subject to a wide variation of adaptations, and which may be economically produced and therefore sold at a minimum price.

With the foregoing objectives and possibly others in view, the invention is hereinafter disclosed more fully in the specification, while the claims particularly mark out and define the scope of the invention.

Figure 1:
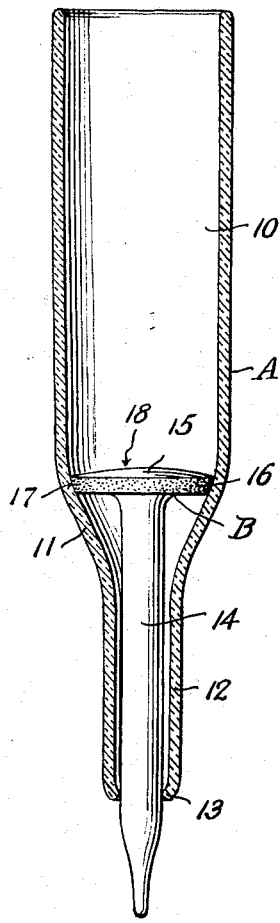
Fig. 1 is a vertical sectional view through a filter funnel embodying the invention and showing the elements thereof associated with each other so that the mating cooperative filter surfaces of said elements are disposed in active relation to each other for filtering.

Referring to the drawing by characters of reference A designates an outer element which includes a cylindrical body 10 having a bottom portion 11 of gradually decreasing cross-sectional internal diameters and which tapers downwardly and merges into a tubular stem portion 12 which depends from the lower end of the bottom portion 11, and which stem portion 12 is formed at its lower free end with an inwardly directed or constricted annular terminal 13.

Figure 2:
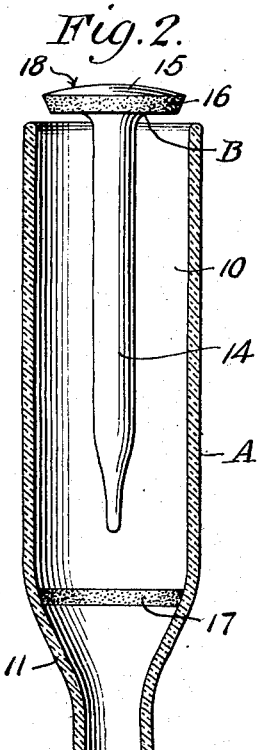
Fig. 2 is a similar view showing the filter funnel elements separated so as to expose the filter surfaces for visual inspection and cleansing.

The filter funnel also includes an inner element B which is displaceably associated with the outer element A and which includes a stem portion 14 of lesser cross-sectional size than the inside diameter of the stem portion 12 of the outer element and which stem portion 14 is formed at its upper end with a head portion 15 having a downwardly tapering frusto-conical outer periphery 16. In producing the filter funnel, which is preferably of heat resisting glass such as "Pyrex," the inner element B is associated with the outer element A as illustrated in Fig. 1 of the drawing so that the frusto-conical periphery 16 of the head 15 is seated on the downwardly tapering frusto-conical inner surface of the bottom portion 11 of the outer element A. By using an abrasive paste, the periphery 16 of the head is rotated against the inner surface of the bottom portion 11 to form a ground annular seat 17 within the bottom portion of the outer element A. This provides the inner and outer elements of the funnel with coacting or cooperative annular filtering surfaces between which filtrate is adapted to pass when a filter mass is superimposed upon the upper surface of the head 15, which upper surface 18 is convex to cause the filtrate to flow radially outward to the outer periphery of the head. It is of course understood that the stem 12 may be inserted within the neck of a filter flask so that suction may be applied to the underside of the head 15 to draw the filtrate between the cooperative ground filtering surfaces. After the filtering operation, it is apparent that the outer and inner elements of the filter funnel may be separated as illustrated in Fig. 2 so that the filtering surfaces 16 and 17 may be exposed for visual inspection and for mechanical cleansing in order that the filter may be subsequently used.

Figure 3:
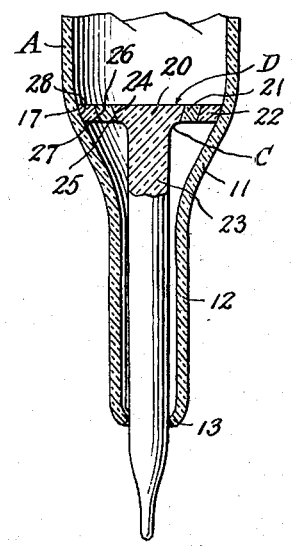
Fig. 3 is a fragmentary vertical sectional view illustrating a modified adaptation of the invention.
Figure 4:
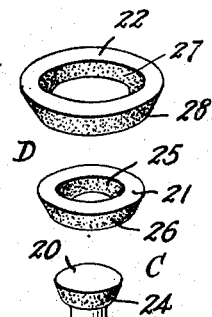
Fig. 4 is a collective perspective view of the parts of the inner element of the funnel illustrating the same in separated juxtaposition.

In the form of the invention illustrated in Figs. 3 and 4 the inner element designated generally by the reference character C includes a head D which is composed of a plurality of concentrically arranged circular parts 20, 21 and 22, the former part 20 being formed integral with the stem 23 and provided with a downwardly tapering frusto-conical outer peripheral edge 24 which is ground. The part 21 is of annular or ring shape formation and is provided with a downwardly tapering frusto-conical ground peripheral inner edge 25 with which the outer peripherial edge 24 of the head part 20 is adapted to mate to define annular filter surfaces between which the filtrate is adapted to pass. The head part 21 is also provided with a downwardly tapering frusto-conical outer peripheral edge 26 which is also ground and which is adapted to seat within the inner peripheral edge 27 of the outermost head part 22, which peripheral edge 27 is of downwardly tapering frusto-conical formation and ground to snugly interfit with the outer perphery 26 of the head part 21 to define mating annular cooperative filter surfaces between which the filtrate is adapted to pass. The head part 22 is formed with a downwardly tapering frusto-conical ground outer peripheral edge 28 which is adapted to interfit with the ground annular seat 17 on the inner surface of the bottom portion 11 of the outer element A of the filter funnel so as to define mating filter surfaces between which the filtrate is adapted to pass when the filter mass is arranged within the funnel body portion 10 upon the head D. This provides a filter funnel having a plurality of mating pairs of annular cooperative filter surfaces which are concentrically arranged.

Figure 5:
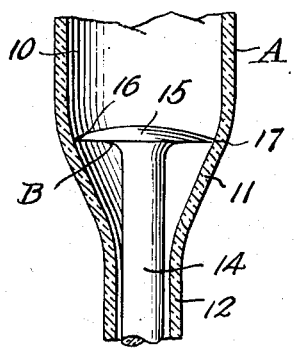
Fig. 5 is a fragmentary sectional view showing another adaptation of the invention.

In the modified adaptation of the invention illustrated in Fig. 5 of the drawing the outer element A is precisely the same as in the previous forms with the exception that the ground seat 17 within the bottom portion 11 is narrower and the head 15 has a narrower outer edge 16 so that the filter edges which cooperate with each other are substantially linear permitting of more rapid filtration.

Figure 6:
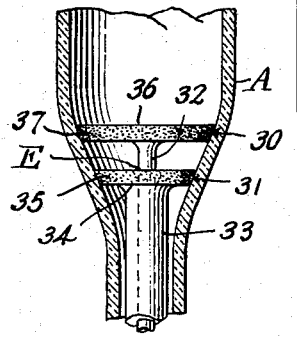
Fig. 6 is a similar view of a further adaptation.

In the form of the invention shown in Fig. 6 the outer element A is provided with a pair of vertically spaced downwardly tapering frusto-conical ground seats 30 and 31 and the inner element designated generally by the reference character E consists of a pair of telescopically associated inner and outer stems 32 and 33, the outer stem 32 being of tubular formation and having an annular head portion 34 at the upper end thereof which head 34 is formed with a downwardly tapering frusto-conical ground outer peripheral edge 35 displaceably engaged and mating with the lower ground seat 31 on the inner surface of the bottom portion of the outer element A. The inner stem 32 is provided at its upper end with a head portion 36 of larger diameter than the head portion 34 and which head portion 36 is formed with a downwardly tapering frusto-conical ground outer peripheral edge 37 displaceably engaged and mating with the upper ground seat 30 on the inner surface of the bottom portion of the outer element A. This defines a filter funnel having superposed pairs of mating annular filter surfaces between which the filtrate is adapted to successively pass from a filter mass supported within the funnel body upon the upper head 36.

In forms of the invention illustrated in Figs. 3 to 6 inclusive, it is apparent that all of the mating filter surfaces may be readily separated for the purpose of visual inspection and cleansing thereof after the filtering operation has been accomplished. It should also be noted that in assembling the inner elements of the funnels with the outer elements thereof, the stems of said inner elements function as a means for insuring a proper seating and a perfect alignment of the filtering surfaces or edges.

What is claimed is:

1. In a filter funnel, an outer element including a hollow cylindrical body provided with a bottom portion of gradually decreasing cross-sectional internal diameters having a downwardly tapering frusto-conical ground seat on the inner surface thereof and a tubular stem portion depending from the lower end of the bottom portion, and an inner element removably associated with the outer element and including a stem portion of lesser cross-sectional size than the inside diameter of the stem portion of the outer element and a circular head portion at the upper end of the stem portion having a downwardly tapering frusto-conical ground outer peripheral edge displaceably engaged and co-operating with the seat of the bottom portion of the body of the outer element to define mating annular filter surfaces which permits the filtrate to pass therebetween.

2. In a filter funnel, an outer element including a hollow cylindrical body provided with a bottom portion of gradually decreasing internal diameters tapering downwardly and formed with a ground seat and a tubular stem portion depending from the lower end of said bottom portion, and an inner element removably associated with the outer element and including a stem portion loosely arranged within the stem portion of the outer element and having a head at the upper end thereof adapted to support a filter mass, said head consisting of a plurality of concentrically arranged circular parts having mating downwardly tapering frusto-conical ground peripheral edges respectively engaging with each other and the seat of the outer element to provide a plurality of pairs of cooperating annular filter surfaces which permits the filtrate to pass therebetween.

3. In a filter funnel, an outer element including a hollow cylindrical body provided with a bottom portion of gradually decreasing internal diameters tapering downwardly and having a tubular stem portion depending from the bottom portion, said bottom portion having a pair of vertically spaced downwardly tapering frusto-conical ground seats on the inner surface thereof, and an inner element removably associated with the outer element and including a pair of telescopically associated inner and outer stems the outer one of which is of tubular formation and of smaller outside diameter than the inside diameter of the stem portion of the body and is provided with an annular head at the upper end thereof which head is formed with a downwardly tapering frusto-conical ground outer periphery displaceably engaged with the lower ground seat on the inner surface of the bottom portion of the outer element, and a head portion at the upper end of the inner stem formed with a downwardly tapering frusto-conical ground outer periphery displaceably engaged with the upper ground seat of the outer element to define superposed pairs of mating annular filter surfaces which permits the filtrate to successively pass therebetween.

4. In a filter funnel, an outer element including a hollow body provided with a bottom portion having a tubular stem portion depending therefrom, and an inner element removably associated therewith and including a stem portion loosely arranged within the stem portion of the outer element and a head at the upper end of the stem portion of the inner element arranged within the body of the outer element for supporting a filter mass thereon and within the body said outer element and the head of the inner element having mating cooperative ground filtering surfaces engaged with each other to permit the filtrate to pass therebetween.

5. In a filtering device, an outer element including a hollow body, and an inner element removably arranged within the body of said outer element for supporting thereon within the confines of the body a filter mass, said inner and outer elements having mating cooperative ground filtering surfaces engaging with each other when the elements of the device are associated for permitting the filtrate to pass between said filtering surfaces, said filtering surfaces being adapted to be exposed for visual inspection and mechanical cleansing thereof when the elements of said device are disassociated and separated from each other.

OTTO W. POST.